United States Patent
Chen et al.

(10) Patent No.: US 9,087,662 B2
(45) Date of Patent: Jul. 21, 2015

(54) KEYBOARD WITH INDUCTION ANTENNA ARRANGED UNDER A KEY

(71) Applicant: Primax Electronics Ltd., Neihu, Taipei (TW)

(72) Inventors: Bo-An Chen, Taipei (TW); Hsien-Tsan Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 88 days.

(21) Appl. No.: 14/104,453

(22) Filed: Dec. 12, 2013

(65) Prior Publication Data
US 2015/0114813 A1    Apr. 30, 2015

(30) Foreign Application Priority Data

Oct. 25, 2013 (TW) .............................. 102138734 A

(51) Int. Cl.
*G06F 3/02* (2006.01)
*H01H 13/83* (2006.01)
*G06F 1/32* (2006.01)
*H01H 13/70* (2006.01)

(52) U.S. Cl.
CPC ............ *H01H 13/70* (2013.01); *G06F 1/3271* (2013.01); *G06F 3/0202* (2013.01); *H01H 13/83* (2013.01)

(58) Field of Classification Search
CPC ... G06F 1/3215; G06F 1/3271; G06F 3/0202; H01H 13/83
See application file for complete search history.

(56) References Cited

U.S. PATENT DOCUMENTS

2014/0317574 A1* 10/2014 Xue et al. ....................... 715/852
2015/0107975 A1* 4/2015 Chen et al. ..................... 200/5 A

FOREIGN PATENT DOCUMENTS

| CN | 201440241 U | * | 4/2010 | ............... G06F 3/02 |
| JP | 2013061854 A | * | 4/2013 | ............... G06F 3/02 |

OTHER PUBLICATIONS

Wang, Yi; "Applications and Considerations of Capacitive Proximity Sensing," Jun. 19, 2009; EDN Network; from www.edn.com.*

* cited by examiner

*Primary Examiner* — Daniel J Colilla
(74) *Attorney, Agent, or Firm* — Kirton McConkie; Evan R. Witt

(57) ABSTRACT

A keyboard includes a membrane switch circuit module, a metallic supporting plate, plural keys, an induction antenna assembly, and a signal processing unit. The induction antenna assembly includes a first partition plate, a second partition plate and an antenna layer. The first partition plate is arranged between the metallic supporting plate and the keycap of a specified key. The second partition plate is connected with the first partition plate and arranged between the first partition plate and the keycap of the specified key. The antenna layer is arranged between the first partition plate and the second partition plate. The signal processing unit is electrically connected with the antenna layer. When the antenna layer senses that an object enters the sensing range, the signal processing unit issues a sensing signal.

20 Claims, 7 Drawing Sheets

KEYBOARD WITH INDUCTION ANTENNA ARRANGED UNDER A KEY

FIELD OF THE INVENTION

The present invention relates to a keyboard, and more particularly to a keyboard having a function of sensing whether an object enters a sensing range.

BACKGROUND OF THE INVENTION

A keyboard is a peripheral device for inputting characters or commands into an information apparatus such as a desktop computer, a notebook computer, a mobile phone or a tablet computer. Generally, the keyboard has plural keys. When one of these keys is depressed by the user's finger, a corresponding signal is issued to the information apparatus, and thus the information apparatus executes a function (e.g. the function of inputting a character).

Generally, when the computer is no longer used by the user for a certain time period, a backlight module of the display screen of the computer may be turned off or the computer may enter a sleep mode or a hibernation mode. When the computer is used by the user again, it is necessary to press a key of the keyboard in order to turn on the backlight module of the display screen or wake up the computer from the sleep mode or the hibernation mode. As known, the way of operating the conventional keyboard is not user-friendly. Moreover, if the user erroneously judges that the computer is turned off, the user may restart the computer. Since the computer is not normally turned off, the starting process of the computer may shorten the use life of the computer or even lose important data of the computer.

Recently, a keyboard having an illuminating function has gradually become the mainstream in the market. Generally, the illuminating function of the conventional keyboard is enabled or disabled manually. The illuminating function of the keyboard is usually enabled by the user in the dim environment. However, after the keyboard is enabled, the user often forgets disabling the illuminating function of the keyboard. Consequently, even if the keyboard is used in a bright environment or the keyboard is not used by any user, the light-emitting element still emits the light beam. In other words, the use of the conventional keyboard has the problem of wasting electric power.

For solving the above drawbacks, a keyboard with a function of sensing whether an object enters a sensing range is disclosed. FIG. 1 is a schematic cross-sectional view illustrating a conventional keyboard with a function of sensing whether an object enters a sensing range. This keyboard 1 is disclosed in Chinese utility model patent Nos. CN201440241. As shown in FIG. 1, the keyboard 1 comprises a keycap layer 11, a light guide plate 12, a metal resilience layer 13, a membrane circuit board 14, at least one light emitting diode 15, an induction processing device 16, an induction antenna 17, and a keyboard housing 18. The induction processing device 16 is located at a side of an inner portion of the keyboard housing 18. The induction antenna 17 is electrically connected with the induction processing device 16. When a user is located near or far from the keyboard 1, the induction processing device 16 senses whether the user enters the sensing range according to the detecting result of the induction antenna 17. Consequently, the light emitting diode 15 is automatically turned on or turned off.

In Chinese utility model patent Nos. CN201440241, the induction antenna 17 is directly printed on the membrane circuit board 14 or circularly disposed within the keyboard housing 18. In case that the induction antenna 17 is printed on the membrane circuit board 14, the induction antenna 17 should be separated from the traces of the membrane circuit board 14. Under this circumstance, the position of installing the induction antenna 17 is restricted, and the fabricating process is complicated. Whereas, in case that the induction antenna 17 is circularly disposed within the keyboard housing 18, the size of the keyboard housing 18 should be large enough to accommodate the induction antenna 17. Under this circumstance, the keyboard fails to meet the requirements of light weightiness, slimness and miniaturization. In the above two situations, since the induction antenna 17 is very close to the metal resilience layer 13, a signal interference problem occurs.

Therefore, there is a need of providing an improved keyboard with a function of sensing whether an object enters a sensing range in order to eliminate the above drawbacks.

SUMMARY OF THE INVENTION

An object of the present invention provides a keyboard with a proximity sensor in order to meet the slimness requirement and minimize the signal interference problem.

In accordance with an aspect of the present invention, there is provided a keyboard. The keyboard includes a membrane switch circuit module, a metallic supporting plate, plural keys, an induction antenna assembly, and a signal processing unit. The membrane switch circuit module generates plural key switch signals. The metallic supporting plate is disposed under the membrane switch circuit module. The plural keys are disposed over the membrane switch circuit module. When the plural keys are depressed, the membrane switch circuit module generates the plural key switch signals. The induction antenna assembly is arranged between the metallic supporting plate and a specified key of the plural keys. The induction antenna assembly includes a first partition plate, a second partition plate and an antenna layer. The second partition plate is connected with the first partition plate and arranged between the first partition plate and the specified key. The antenna layer is arranged between the first partition plate and the second partition plate. The signal processing unit is electrically connected with the antenna layer. When the antenna layer senses that an object enters a sensing range, the signal processing unit issues a sensing signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
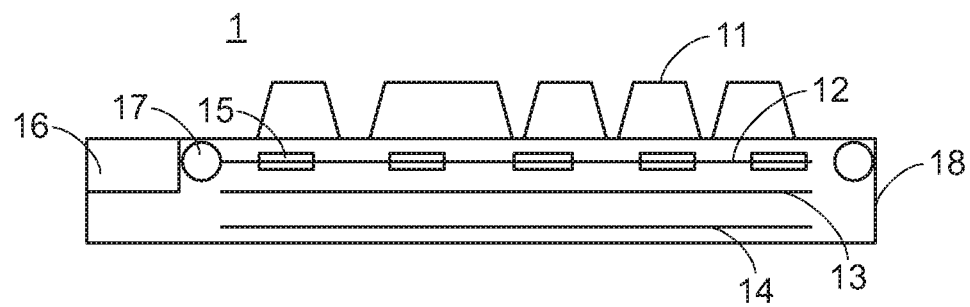
FIG. 1 is a schematic cross-sectional view illustrating a conventional keyboard with a function of sensing whether an object enters a sensing range.
Figure 2:
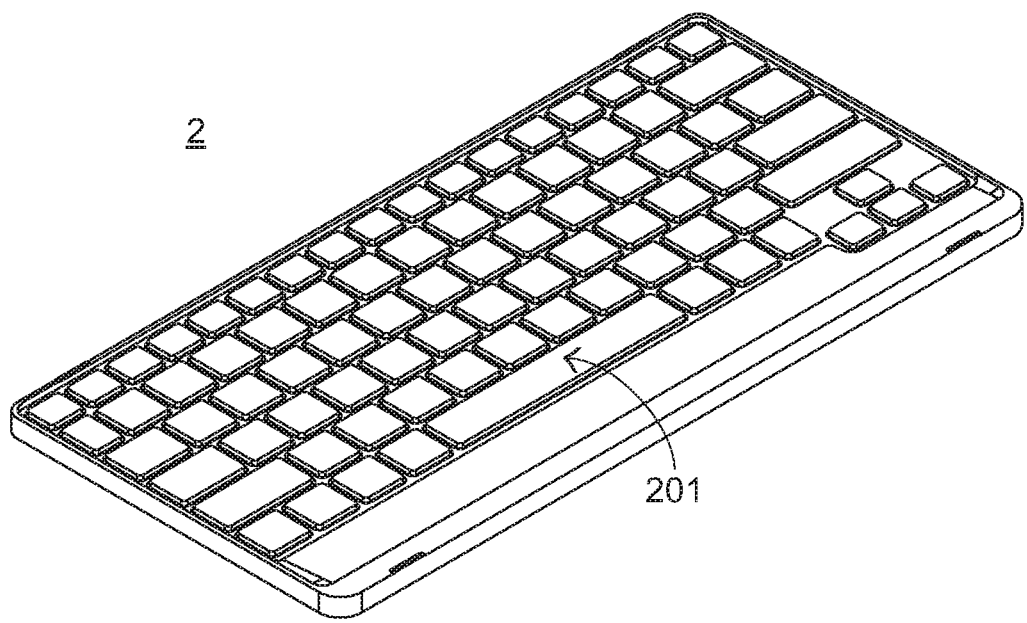
FIG. 2 is a schematic perspective view illustrating the outer appearance of a keyboard according to a first embodiment of the present invention.
Figure 3:
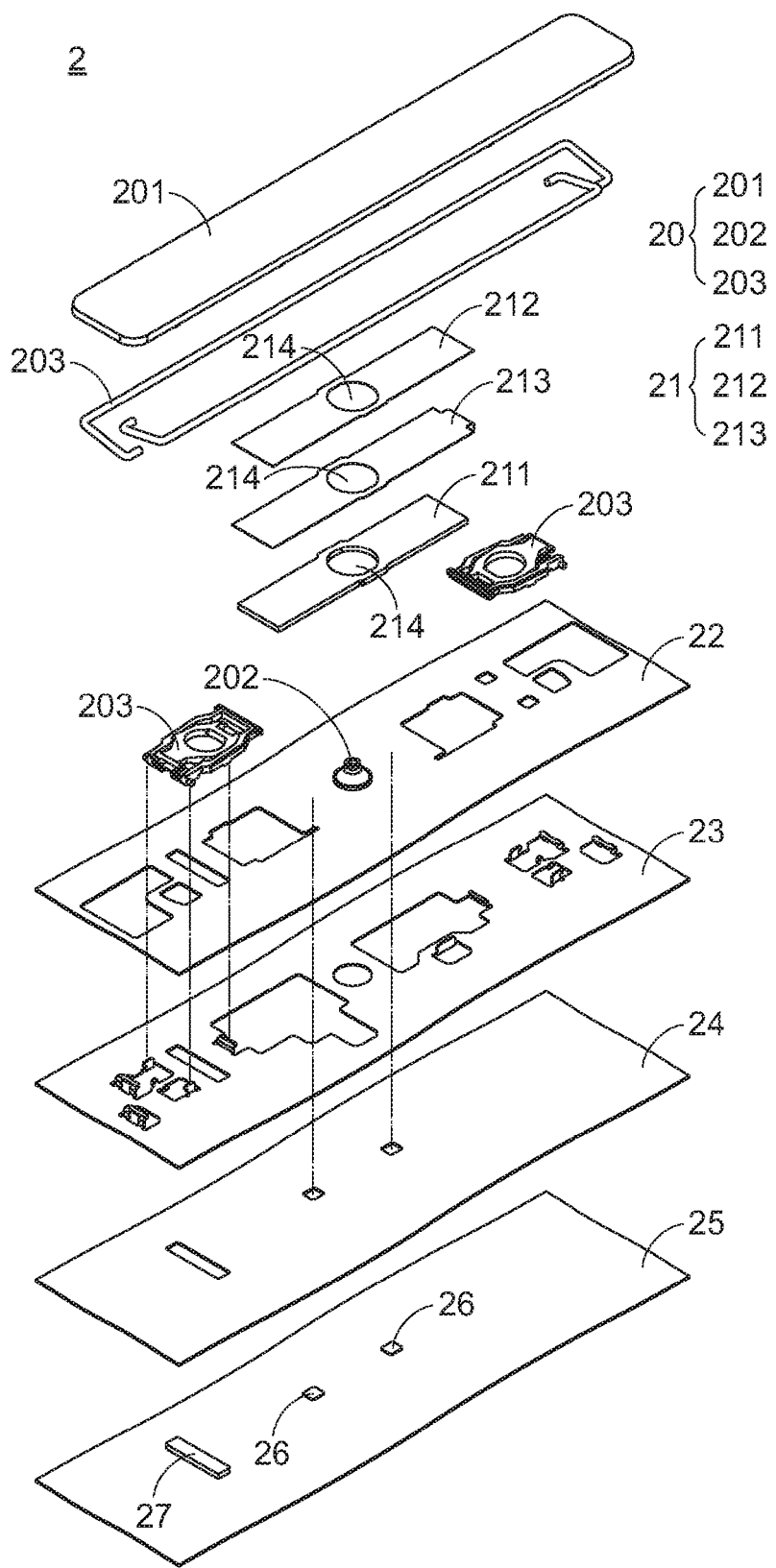
FIG. 3 is a schematic partial exploded view illustrating the keyboard according to the first embodiment of the present invention.
Figure 4:
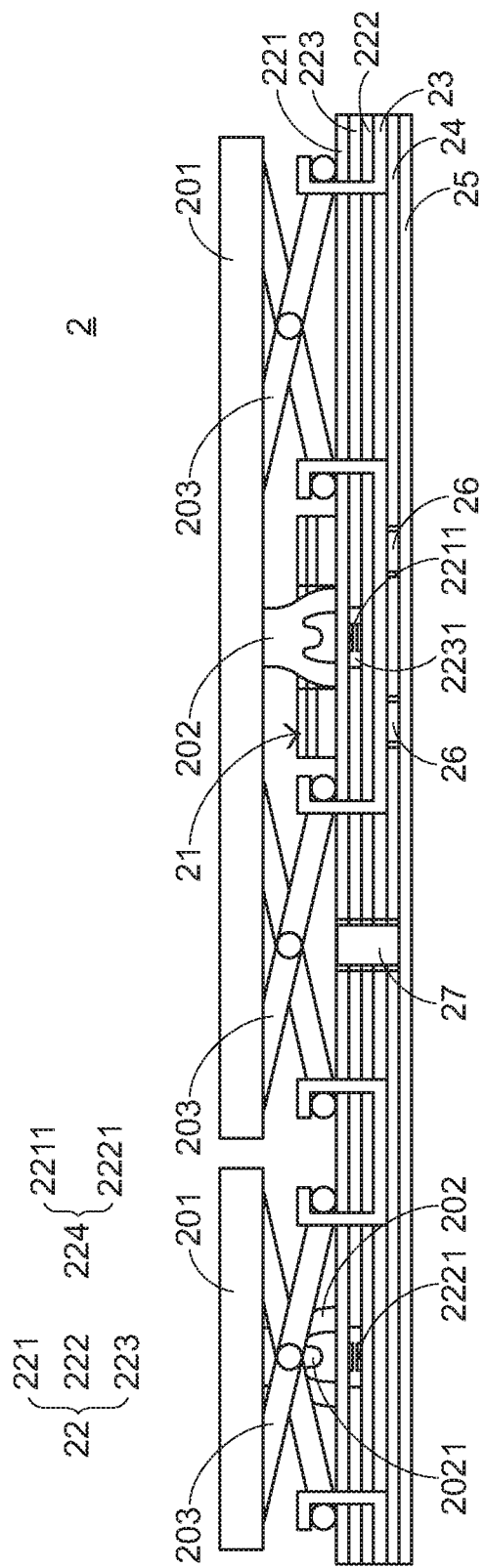
FIG. 4 is a schematic partial cross-sectional view illustrating the keyboard according to the first embodiment of the present invention.

Hereinafter, a keyboard with a function of sensing whether an object enters a sensing range according to a first embodiment of the present invention will be illustrated with reference to FIGS. 2~4. FIG. 2 is a schematic perspective view illustrating the outer appearance of a keyboard according to a first embodiment of the present invention. FIG. 3 is a schematic partial exploded view illustrating the keyboard according to the first embodiment of the present invention. FIG. 4 is a schematic partial cross-sectional view illustrating the keyboard according to the first embodiment of the present invention. For clarification and brevity, only the exploded views of one keycap 201 (e.g. the keycap of a spacer bar) and the underlying structures of the keyboard 2 of FIG. 2 are shown in FIG. 3. In addition, only the cross-sectional views of two keycaps 201 and the underlying structures of the keyboard 2 are shown in FIG. 4.

The components of the keyboard 2 will be illustrated in more details as follows. Please refer to FIGS. 3 and 4. The keyboard 2 comprises the plural keys 20, an induction antenna assembly 21, a membrane switch circuit module 22, a metallic supporting plate 23, a light guide plate 24, an illumination circuit board 25, at least one light-emitting element 26, and a signal processing unit 27. It is noted that only portions of the membrane switch circuit module 22, the metallic supporting plate 23, the light guide plate 24, the illumination circuit board 25 and the at least one light-emitting element 26 are shown in FIGS. 3 and 4.

Each of the plural keys 20 comprises a keycap 201, an elastic element 202, and at least one connecting element 203. The induction antenna assembly 21 comprises a first partition plate 211, a second partition plate 212, and an antenna layer 213. The membrane switch circuit module 22 comprises an upper wiring layer 221, a lower wiring layer 222, and an intermediate layer 223.

Plural upper contacts 2211 are formed on a bottom surface of the upper wiring layer 221 of the membrane switch circuit module 22. Plural lower contacts 2221 are formed on a top surface of the lower wiring layer 222. Each of the upper contacts 2211 and the corresponding lower contact 2221 are collaboratively defined as a membrane switch 224. In addition, each membrane switch 224 is aligned with a corresponding key 20.

The intermediate layer 223 is arranged between the upper wiring layer 221 and the lower wiring layer 222 for separating the upper wiring layer 221 and the lower wiring layer 222 from each other. Consequently, each of the upper contacts 2211 and the corresponding lower contact 2221 are separated from each other by a spacing distance. In addition, the intermediate layer 223 has plural perforations 2231 corresponding to the plural upper contacts 2211.

The sequence of assembling the keyboard 2 will be illustrated in more details as follows. Firstly, the plural keys 20 are disposed over the membrane switch circuit module 22. In particular, the plural elastic elements 202 are fixed on the membrane switch circuit module 22, and connected with the plural keycaps 201, respectively. The plural connecting elements 203 are arranged between the plural keycaps 201 and the membrane switch circuit module 22, and connected with respective keycaps 201 and the metallic supporting plate 23. In this embodiment, the connecting element 203 is a scissors-type connecting element or a U-shaped connecting element 203, but is not limited thereto.

When one of the keycaps 201 is depressed, the keycap 201 is moved downwardly with the assistance of the connecting element 203. At the same time, the elastic element 202 is compressed by the keycap 201 and thus subject to deformation. Consequently, a protrusion part 2021 within the elastic element 202 is moved downwardly to push the membrane switch circuit module 22. Under this circumstance, the upper contact 2211 of the membrane switch 224 corresponding to the depressed keycap 201 is penetrated through the corresponding perforation 2231 and contacted with the corresponding lower contact 2221. Consequently, the membrane switch circuit module 22 generates a corresponding key switch signal. According to the key switch signal, a corresponding function (e.g. a function of inputting a character, a symbol or a number into a computer system) is executed by the keyboard 2.

In accordance with the features of the keyboard 2, the induction antenna assembly 21 is fixed on the membrane switch circuit module 22, and disposed under a specified keyboard 201. In this embodiment, the induction antenna assembly 21 is disposed under the keycap of the space bar, but is not limited thereto. Alternatively, the induction antenna assembly 21 may be disposed under the keycap of a Shift key, the keycap of an Enter key or any other appropriate large-sized keycap. In an embodiment, the keycap 21 has a single induction antenna assembly 21. Alternatively, in some other embodiments, the keycap 21 has plural induction antenna assemblies 21, and the plural induction antenna assemblies 21 are disposed under different keycaps 201, respectively. The structure of the induction antenna assembly 21 of this embodiment will be illustrated as follows.

Firstly, the first partition plate 211 is fixed on the membrane switch circuit module 22, and disposed under a specified keycap 201. Then, the antenna layer 213 is formed on a top surface of the first partition plate 211 (i.e. the surface away from the membrane switch circuit module 22) or a bottom surface of the first partition plate 211 (i.e. the surface near the membrane switch circuit module 22). Then, the second partition plate 212 is fixed on the first partition plate 211, and the second partition plate 212 is arranged between the first partition plate 211 and the specified keycap 201.

By using the first partition plate 211, the antenna layer 213 is closer to the keycap 201. That is, the antenna layer 213 is closer to the object to be sensed. Consequently, the thickness of the first partition plate 211 may be adjusted according to the practical requirements. The second partition plate 212 is used to minimize the influence of electrostatic discharge on the antenna layer 213. Consequently, a small thickness of the second partition plate 212 is sufficient. The overall thickness of the induction antenna assembly 21 is not restricted as long as the movement of the keycap 201 is not hindered by the induction antenna assembly 21. That is, it is necessary to maintain a certain distance between the induction antenna assembly 21 and an inner surface of the keycap 201 in order to allow for normal movement of the keycap 201.

Moreover, the induction antenna assembly 21 further comprises an aperture 214. The aperture 214 runs through a middle region of the induction antenna assembly 21. The aperture 214 is sheathed around the elastic element 202.

Consequently, the antenna layer 213 is distributed around the bilateral sides of the elastic element 202. Under this circumstance, the sensing range of the antenna layer 213 is broadened. Alternatively, in some other embodiments, the induction antenna assembly 21 has no aperture 214, but the induction antenna assembly 21 is located beside the elastic element 202.

An example of each of the first partition plate 211 and the second partition plate 212 includes but is not limited to a PET film or a PC film. In this embodiment, the antenna layer 213 is a silver paste conductive line that is formed on the top surface of the first partition plate 211 or the bottom surface of the second partition plate 212 by a screen printing process, but is not limited thereto. Moreover, the first partition plate 211 may be fixed on the membrane switch circuit module 22 by any appropriate adhering method, and the second partition plate 212 may be fixed on the first partition plate 211 by any appropriate adhering method.

Moreover, the metallic supporting plate 23 is disposed under the membrane switch circuit module 22 for enhancing the overall structural strength of the keyboard 2. In addition, the metallic supporting plate 23 is connected with the plural connecting elements 203 of the plural keys 20. Consequently, the plural connecting elements 203 are fixed between the plural keys 20 and the membrane switch circuit module 22. In this embodiment, the metallic supporting plate 23 is an iron plate, but is not limited thereto.

Then, the light guide plate 24 is disposed under the metallic supporting plate 23. The light guide plate 24 is made of a transparent light-guiding material with low absorptivity and high refractivity to the light beam. An example of the transparent light-guiding material includes but is not limited to polycarbonate (PC), polymethylmethacrylate (PMMA), polyethylene terephthalate (PET) or silicone.

Then, the illumination circuit board 25 is disposed under the light guide plate 24. In addition, the at least one light-emitting element 26 and the signal processing unit 27 are both disposed on the illumination circuit board 25, and electrically connected with the illumination circuit board 25. It is noted that the shape and the position of the illumination circuit board 25, the number and the position of the at least one light-emitting element 26 and the position of the signal processing unit 27 shown in the drawings are presented herein for purpose of illustration and description only. Moreover, an example of the illumination circuit board 25 includes but is not limited to a printed circuit board (PCB) or a flexible printed circuit (FPC).

Moreover, the antenna layer 213 of the induction antenna assembly 21 is electrically connected with the signal processing unit 27 by a thermal bonding process, but is not limited thereto. For example, in the thermal bonding process, the antenna layer 213 and the signal processing unit 27 are connected with each other by an anisotropic conductive film (ACF). It is noted that the way of bonding the antenna layer 213 and the signal processing unit 27 is not restricted.

The signal processing unit 27 may be penetrated through the membrane switch circuit module 22, the metallic supporting plate 23 and the light guide plate 24, and received within the region under the keycap 201 of a specified key with a larger width (e.g. the keycap 201 of a space bar).

The light-emitting element 26 may be penetrated through the light guide plate 24. Consequently, the light beam from the light-emitting element 26 is laterally introduced into the light guide plate 24. The light beam from the light-emitting element 26 is transferred by the light guide plate 24, so that the light beam is diffused to the regions under all of the plural keys 20. Alternatively, in some other embodiments, the signal processing unit 27 and the light-emitting element 26 are not penetrated through the membrane switch circuit module 22, the metallic supporting plate 23 or the light guide plate 24, but located at a lateral side of the membrane switch circuit module 22, the metallic supporting plate 23 or the light guide plate 24.

Hereinafter, the operating principles of the keyboard 2 of this embodiment will be illustrated in more details. In this embodiment, the antenna layer 213 and the signal processing unit 27 are capacitive sensors. When the illumination circuit board 25 is electrically conducted, an induction electric field (not shown) is generated by the antenna layer 213.

Moreover, when an object (e.g. a human body) is located near the induction electric field, the induction electric field is subject to a change (not shown). According to the change of the induction electric field, the signal processing unit 27 electrically connected with the antenna layer 213 may judge that the object enters a sensing range. Consequently, the signal processing unit 27 issues a sensing signal.

After the sensing signal from the signal processing unit 27 is received by the keyboard 2, a controlling unit (not shown) of the keyboard 2 drives illumination of the light-emitting element 26 in response to the sensing signal. Consequently, the illuminating function of the keyboard 2 is enabled. Moreover, in response to the sensing signal, the controlling unit of the keyboard 2 may issue a command to a computing device that is connected with the keyboard 2. According to the command, a backlight module of a display screen (not shown) is turned on, the computing device is waked up from a sleep mode or a hibernation mode, or a specified application program is opened. An example of the computing device includes but is not limited to a desktop computer or a notebook computer.

When the object is far away from the induction electric field, which is generated by the antenna layer 213, the object is no longer within the sensing range. Meanwhile, the induction electric field is also subject to a change. According to the change of the induction electric field, the signal processing unit 27 will notify the controlling unit of the keyboard 2 to stop driving illumination of the light-emitting elements 26. Under this circumstance, the illuminating function of the keyboard 2 is disabled. In other words, by judging whether the user enters the sensing range of the keyboard 2, the illuminating function of the keyboard 2 can be automatically enabled or disabled.

Figure 5:
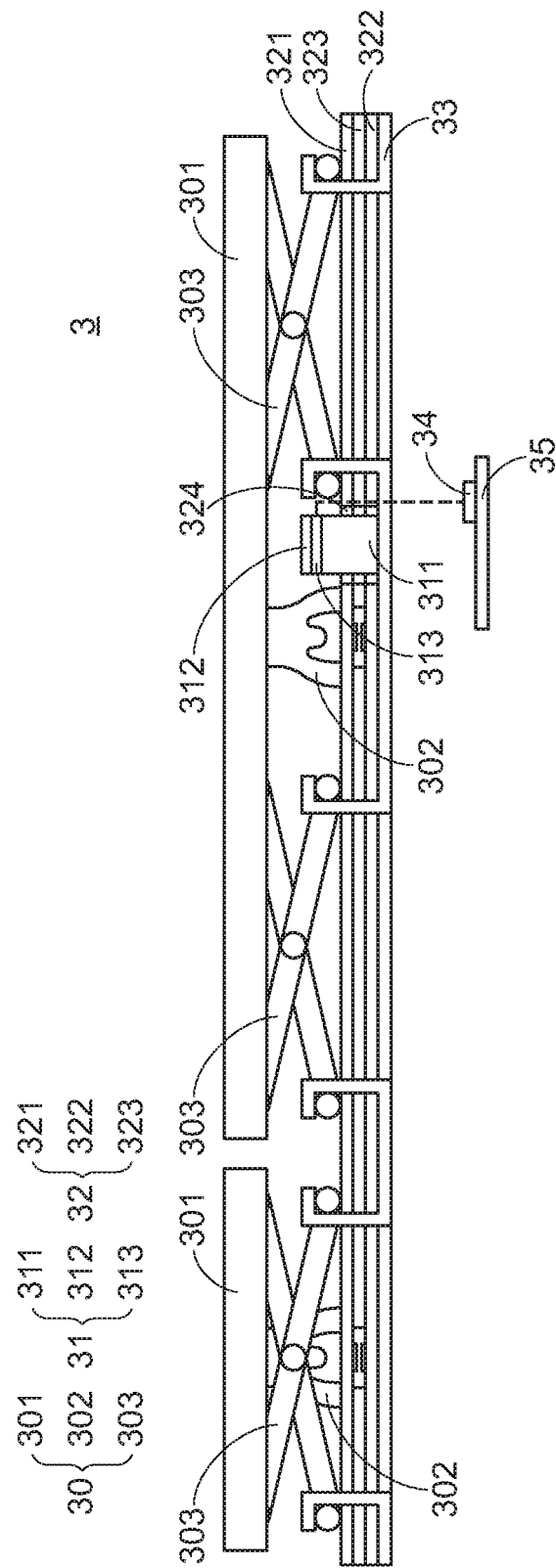
FIG. 5 is a schematic partial cross-sectional view illustrating a keyboard according to a second embodiment of the present invention.

Hereinafter, a keyboard with a function of sensing whether an object enters a sensing range according to a second embodiment of the present invention will be illustrated with reference to FIG. 5. FIG. 5 is a schematic partial cross-sectional view illustrating a keyboard according to a second embodiment of the present invention. For clarification and brevity, only the cross-sectional views of two keycaps 301 and the underlying structures of the keyboard 3 are shown in FIG. 5.

As shown in FIG. 5, the keyboard 3 comprises the plural keys 30, an induction antenna assembly 31, a membrane switch circuit module 32, a metallic supporting plate 33, and a signal processing unit 34. Each of the plural keys 30 comprises a keycap 301, an elastic element 302, and at least one connecting element 303. The induction antenna assembly 31 comprises a first partition plate 311, a second partition plate 312, and an antenna layer 313. The membrane switch circuit module 32 comprises an upper wiring layer 321, a lower wiring layer 322, and an intermediate layer 323.

In comparison with the keyboard 2 of the first embodiment, the membrane switch circuit module 32 of the keyboard 3 of this embodiment has a first opening 324. The induction antenna assembly 31 is fixed on the metallic supporting plate 33, and penetrated through the first opening 324. The induction antenna assembly 31 has no aperture, but the induction antenna assembly 31 is located beside the elastic element 302. Similarly, by using the first partition plate 311, the antenna layer 313 is closer to the keycap 301. That is, the antenna layer 313 is closer to the object to be sensed. Consequently, after the keyboard 3 is assembled, the first partition plate 311 is penetrated through the first opening 324 and exposed over the membrane switch circuit module 32.

Moreover, the keyboard 3 does not comprise the light guide plate, the illumination circuit board and the at least one light-emitting element. Moreover, the signal processing unit 34 is disposed on a circuit board 35. For example, the circuit board 35 is a circuit board of a notebook computer, but is not limited thereto. In response to the sensing signal from the signal processing unit 34, the controlling unit of the keyboard 3 may issue a command to a computing device that is connected with the keyboard 3. According to the command, a backlight module of a display screen (not shown) is turned on, the computing device is waked up from a sleep mode or a hibernation mode, or a specified application program is opened.

The induction antenna assembly 21 of the keyboard 2 may be disposed on the membrane switch circuit module 32 of the keyboard 3 in order to replace the induction antenna assembly 31. Under this circumstance, it is not necessary to form the first opening 324 in the membrane switch circuit module 32. Similarly, the induction antenna assembly 31 of the keyboard 3 may be disposed on the metallic supporting plate 23 of the keyboard 2 in order to replace the induction antenna assembly 21. Under this circumstance, the membrane switch circuit module 32 should have a corresponding opening.

Figure 6:
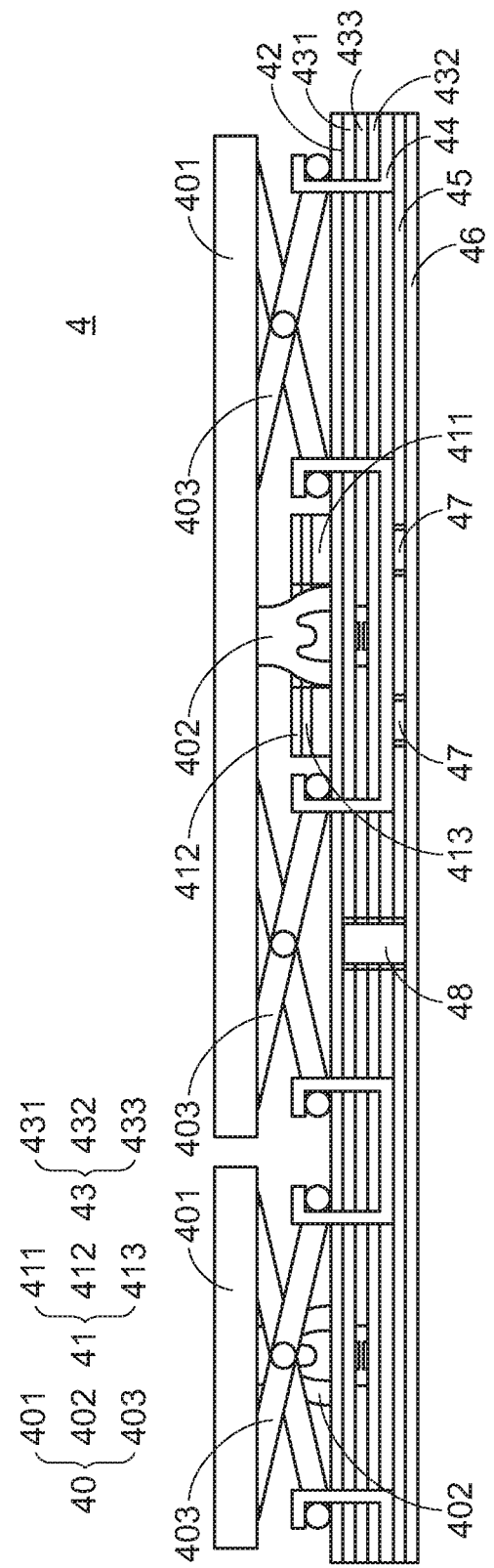
FIG. 6 is a schematic partial cross-sectional view illustrating a keyboard according to a third embodiment of the present invention.

Hereinafter, a keyboard with a function of sensing whether an object enters a sensing range according to a third embodiment of the present invention will be illustrated with reference to FIG. 6. FIG. 6 is a schematic partial cross-sectional view illustrating a keyboard according to a third embodiment of the present invention. For clarification and brevity, only the cross-sectional views of two keycaps 401 and the underlying structures of the keyboard 4 are shown in FIG. 6.

As shown in FIG. 6, the keyboard 4 comprises the plural keys 40, an induction antenna assembly 41, a fixing plate 42, a membrane switch circuit module 43, a metallic supporting plate 44, a light guide plate 45, an illumination circuit board 46, at least one light-emitting element 47, and a signal processing unit 48.

Each of the plural keys 40 comprises a keycap 401, an elastic element 402, and at least one connecting element 403. The induction antenna assembly 41 comprises a first partition plate 411, a second partition plate 412, and an antenna layer 413. The membrane switch circuit module 42 comprises an upper wiring layer 421, a lower wiring layer 422, and an intermediate layer 423.

In comparison with the keyboard 2 of the first embodiment, the keyboard 4 of this embodiment further comprises the fixing plate 42. The fixing plate 42 is arranged between the plural keys 40 and the membrane switch circuit module 43. The plural elastic elements 402 are fixed on the fixing plate 42, and connected with the plural keycaps 401. Moreover, the induction antenna assembly 41 is fixed on the fixing plate 42, and disposed under a specified keycap 401.

An example of the fixing plate 42 includes but is not limited to a PET film or a PC film. The plural elastic elements 402 may be fixed on the fixing plate 42 by an adhering method. Alternatively, the plural elastic elements 402 may be integrally formed with the fixing plate 42.

Figure 7:
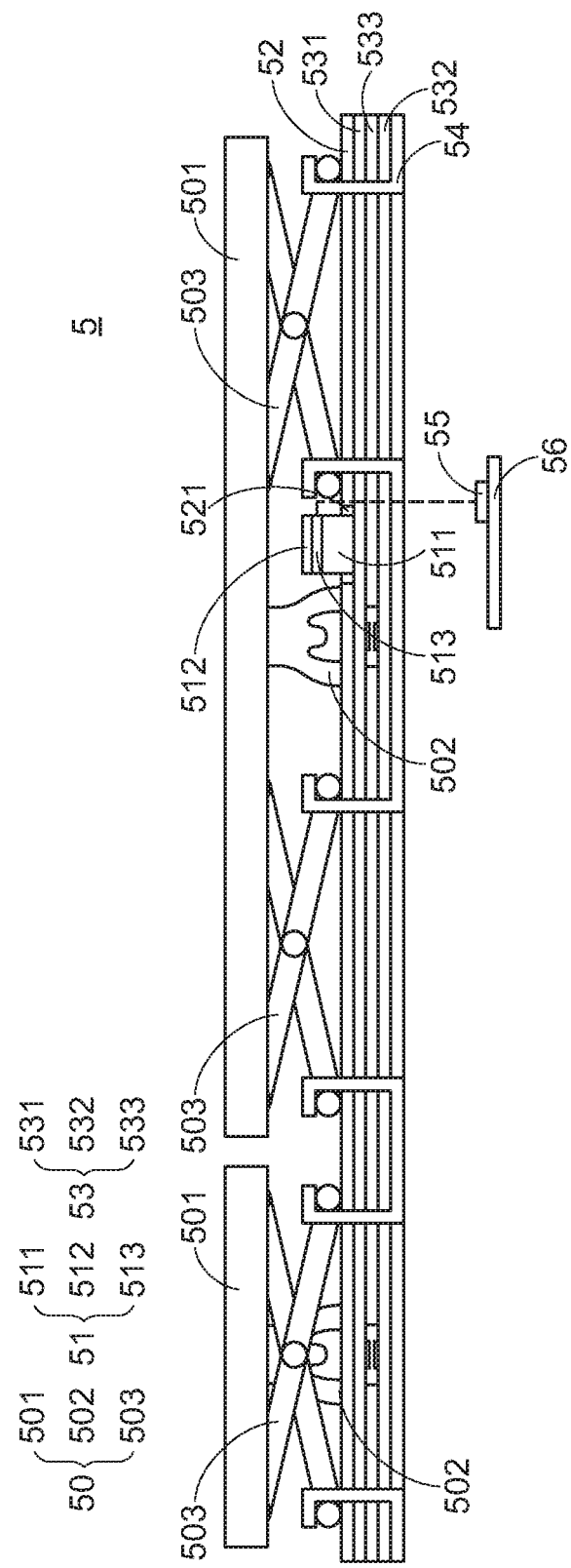
FIG. 7 is a schematic partial cross-sectional view illustrating a keyboard according to a fourth embodiment of the present invention.

Hereinafter, a keyboard with a function of sensing whether an object enters a sensing range according to a fourth embodiment of the present invention will be illustrated with reference to FIG. 7. FIG. 7 is a schematic partial cross-sectional view illustrating a keyboard according to a fourth embodiment of the present invention. For clarification and brevity, only the cross-sectional views of two keycaps 501 and the underlying structures of the keyboard 5 are shown in FIG. 7.

As shown in FIG. 7, the keyboard 5 comprises the plural keys 50, an induction antenna assembly 51, a fixing plate 52, a membrane switch circuit module 53, a metallic supporting plate 54, and a signal processing unit 55.

Each of the plural keys 50 comprises a keycap 501, an elastic element 502, and at least one connecting element 503. The induction antenna assembly 51 comprises a first partition plate 511, a second partition plate 512, and an antenna layer 513. The membrane switch circuit module 53 comprises an upper wiring layer 531, a lower wiring layer 532, and an intermediate layer 533.

In comparison with the keyboard 4 of the third embodiment, the fixing plate 52 of the keyboard 5 of this embodiment has a second opening 521, and the induction antenna assembly 51 is fixed on the membrane switch circuit module 53 and penetrated through the second opening 521. The induction antenna assembly 51 has no aperture, but the induction antenna assembly 51 is located beside the elastic element 502. Similarly, by using the first partition plate 511, the antenna layer 513 is closer to the keycap 501. That is, the antenna layer 513 is closer to the object to be sensed. Consequently, after the keyboard 5 is assembled, the first partition plate 511 is penetrated through the second opening 521 and exposed over the fixing plate 52.

Moreover, the keyboard 5 does not comprise the light guide plate, the illumination circuit board and the at least one light-emitting element. Moreover, the signal processing unit 55 is disposed on a circuit board 56. For example, the circuit board 56 is a circuit board of a notebook computer, but is not limited thereto.

Figure 8:
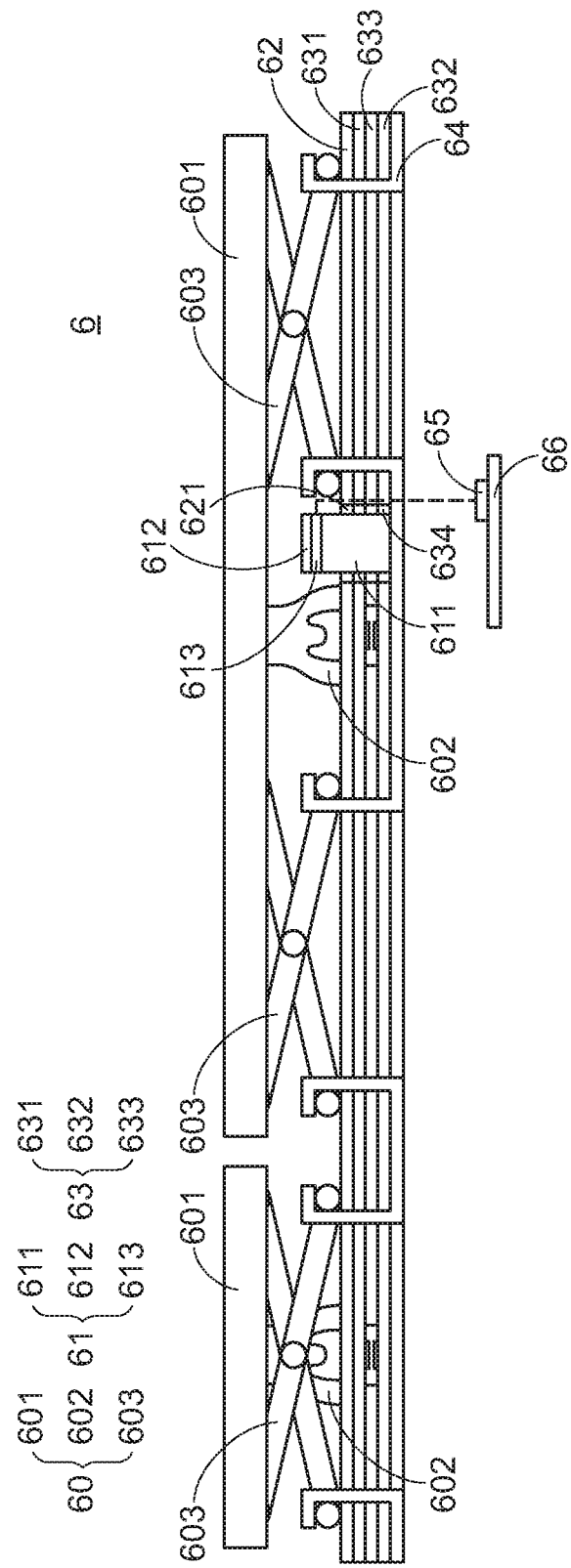
FIG. 8 is a schematic partial cross-sectional view illustrating a keyboard according to a fifth embodiment of the present invention.

Hereinafter, a keyboard with a function of sensing whether an object enters a sensing range according to a fifth embodiment of the present invention will be illustrated with reference to FIG. 8. FIG. 8 is a schematic partial cross-sectional view illustrating a keyboard according to a fifth embodiment of the present invention. For clarification and brevity, only the cross-sectional views of two keycaps 601 and the underlying structures of the keyboard 6 are shown in FIG. 8.

As shown in FIG. 8, the keyboard 6 comprises the plural keys 60, an induction antenna assembly 61, a fixing plate 62, a membrane switch circuit module 63, a metallic supporting plate 64, and a signal processing unit 65.

Each of the plural keys 60 comprises a keycap 601, an elastic element 602, and at least one connecting element 603. The induction antenna assembly 61 comprises a first partition plate 611, a second partition plate 612, and an antenna layer 613. The membrane switch circuit module 63 comprises an upper wiring layer 631, a lower wiring layer 632, and an intermediate layer 633.

In comparison with the keyboard 5 of the fourth embodiment, the membrane switch circuit module 63 has a first opening 634, and the fixing plate 62 has a second opening 621. The induction antenna assembly 61 is fixed on the metallic supporting plate 64, and penetrated through the first opening 634 and the second opening 621. Similarly, by using the first partition plate 611, the antenna layer 613 is closer to the keycap 601. That is, the antenna layer 613 is closer to the object to be sensed. Consequently, after the keyboard 6 is assembled, the first partition plate 611 is penetrated through the first opening 634 and the second opening 621 and exposed over the fixing plate 62.

The induction antenna assembly 41 of the keyboard 4 may be disposed on the fixing plate 52 of the keyboard 5 in order to replace the induction antenna assembly 51. Under this circumstance, it is not necessary to form the second opening 521 in the keyboard 521. Similarly, the induction antenna assembly 51 of the keyboard 5 or the induction antenna assembly 61 of the keyboard 6 may be disposed on the membrane switch circuit module 43 or the metallic supporting plate 44 of the keyboard 4 in order to replace the induction antenna assembly 41. Under this circumstance, it is not necessary to form corresponding openings in the fixing plate 42 or the membrane switch circuit module 43.

From the above descriptions, the keyboard of the present invention provides a keyboard. The keyboard comprises an induction antenna assembly for sensing whether an object enters a sensing range. By adjusting the thickness of the first partition plate and installing the opening, the limitations on the position and the layout area of the induction antenna assembly will be minimized. Moreover, since the induction antenna circuit is far from the metallic supporting plate, the possibility of causing the signal interference problem will be minimized. In addition, the keyboard can meet the requirements of light weightiness, slimness and miniaturization.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A keyboard, comprising:
    a membrane switch circuit module generating plural key switch signals;
    a metallic supporting plate disposed under the membrane switch circuit module;
    plural keys disposed over the membrane switch circuit module, wherein when one of the plural keys is depressed, the membrane switch circuit module generates the corresponding key switch signal;
    an induction antenna assembly arranged between the metallic supporting plate and a specified key of the plural keys, wherein the induction antenna assembly comprises a first partition plate, a second partition plate and an antenna layer, wherein the second partition plate is connected with the first partition plate and arranged between the first partition plate and the specified key, wherein the antenna layer is arranged between the first partition plate and the second partition plate; and
    a signal processing unit electrically connected with the antenna layer, wherein when the antenna layer senses that an object enters a sensing range, the signal processing unit issues a sensing signal.

2. The keyboard according to claim 1, wherein each of the plural keys comprises a keycap and an elastic element.

3. The keyboard according to claim 2, wherein the induction antenna assembly is disposed under the keycap of the specified key.

4. The keyboard according to claim 3, wherein the induction antenna assembly is disposed under the keycap of a space bar, the keycap of a Shift key or the keycap of an Enter key.

5. The keyboard according to claim 2, wherein the induction antenna assembly comprises an aperture, wherein the aperture is sheathed around the elastic element of the specified key.

6. The keyboard according to claim 2, wherein each of the plural keys further comprises at least one connecting element, wherein the at least one connecting element is connected with the keycap and the metallic supporting plate 7. The keyboard according to claim 2, wherein the plural elastic elements are connected with the plural keycaps and the membrane switch circuit module.

8. The keyboard according to claim 7, wherein the membrane switch circuit module comprises a first opening, wherein the induction antenna assembly is fixed on the metallic supporting plate, and penetrated through the first opening.

9. The keyboard according to claim 7, wherein the induction antenna assembly is disposed on the membrane switch circuit module.

10. The keyboard according to claim 2, wherein the keyboard further comprises a fixing plate, wherein the fixing plate is arranged between the plural keys and the membrane switch circuit module, and the plural elastic elements are connected with the plural keycaps and the fixing plate.

11. The keyboard according to claim 10, wherein the membrane switch circuit module comprises a first opening, and the fixing plate comprises a second opening, wherein the induction antenna assembly is fixed on the metallic supporting plate, and penetrated through the first opening and the second opening.

12. The keyboard according to claim 10, wherein the fixing plate comprises an opening, wherein the induction antenna assembly is fixed on the membrane switch circuit module and penetrated through the opening.

13. The keyboard according to claim 10, wherein the induction antenna assembly is disposed on the fixing plate.

14. The keyboard according to claim 10, wherein the plural elastic elements are integrally formed with the fixing plate.

15. The keyboard according to claim 1, wherein the antenna layer and the signal processing unit are capacitive sensors.

16. The keyboard according to claim 1, wherein the keyboard further comprises at least one light-emitting element, wherein in response to the sensing signal from the signal processing unit, the at least one light-emitting element provides a light beam to the keyboard.

17. The keyboard according to claim 1, wherein the keyboard further comprises an illumination circuit board and at least one light-emitting element, wherein the illumination circuit board is disposed under the metallic supporting plate, and the at least one light-emitting element is disposed on the illumination circuit board, wherein the antenna layer and the signal processing unit are electrically connected with the illumination circuit board.

18. The keyboard according to claim 1, wherein the keyboard further comprises a light guide plate and at least one light-emitting element, wherein the light guide plate is disposed under the metallic supporting plate, wherein a light beam from the at least one light-emitting element is transferred by the light guide plate.

19. The keyboard according to claim 1, wherein the keyboard is connected with a computing device, and the computing device comprises a display screen, wherein in response to the sensing signal from the signal processing unit, the computing device is woken up from a sleep mode or a hibernation mode or a backlight function of the display screen is enabled.

20. The keyboard according to claim 1, wherein the membrane switch circuit module comprises:

an upper wiring layer having plural upper contacts;
a lower wiring layer having plural lower contacts, wherein each of the upper contacts and the corresponding lower contact are collaboratively defined as a membrane switch; and
an intermediate layer arranged between the upper wiring layer and the lower wiring layer, so that each of the upper contacts and the corresponding lower contact are separated from each other by a spacing distance, wherein the intermediate layer comprises plural perforations corresponding to the plural upper contacts.

* * * * *